United States Patent [19]

McJohnson et al.

[11] Patent Number: 4,644,143

[45] Date of Patent: Feb. 17, 1987

[54] STATIC BAR CODE READER

[75] Inventors: Robert B. McJohnson, Pilot Point; Adrian B. Currin, Dallas; Robert R. Nelson, Richardson, all of Tex.

[73] Assignee: Veeco Integrated Automation, Inc., Dallas, Tex.

[21] Appl. No.: 681,116

[22] Filed: Dec. 13, 1984

[51] Int. Cl.[4] .............................................. G06K 7/10
[52] U.S. Cl. ..................................... 235/462; 235/385
[58] Field of Search ......................... 235/462, 495, 385

[56] References Cited

U.S. PATENT DOCUMENTS 3,886,328  5/1975  Harms .................................. 235/462
3,914,578  10/1975  Bigelow ............................. 235/495
4,408,344  10/1983  McWaters ........................... 235/462

Primary Examiner—Harold I. Pitts
Attorney, Agent, or Firm—Morgan & Finnegan

[57] ABSTRACT

In a static optical bar code reader, a stationary bar code is disposed in operative relationship to a light sensitive charge coupled device. The photosites of the charge coupled device convert light from the contrasting segments of the bar code to an analog voltage. The analog output of the charge coupled device is applied to a circuit which converts it to a digital signal. The digital signal is transmitted to a suitably programmed microprocessor which preferably decodes the digital signal and recovers the information included in the bar code. The output of the microprocessor may be applied to a display, a host computer or some other utilization device.

20 Claims, 8 Drawing Figures

CODE = 14698

4,644,143

STATIC BAR CODE READER

BACKGROUND OF THE INVENTION

1. Field of the Invention

The apparatus of the present invention relates generally to bar code readers and more specifically to a static optical bar code reader which can identify a stationary bar code.

2. Description of the Prior Art

Optical bar code readers are well known in the art and typically require relative movement between an optical reading device and the bar code. In point of sale systems commonly found in grocery stores, a coded item for sale is moved relative to an optical reading device disposed in the check-out counter. In other systems typically found in clothing stores, a hand-held wand or a similar device is moved relative to a bar code located on the price tag.

In an inventory or warehousing system in which a coded article is disposed in a stationary position for a prolonged period of time, the need for relative movement between the bar code reader and the bar code is a particulary disadvantageous requirement. Relative movement between the bar code and bar code reader would require the physical movement of the item or alternatively would require the insertion of a bar code reading device into the storage area. Both of these requirements are undersirable in many instances.

A particulary undesirable instance occurs in the manufacture of semiconductor devices. Semiconductor wafers are typically processed in batches of twenty-five or fifty. These wafers are held in cassettes in groups of twenty-five between processing steps. In order to maintain cleanliness, these cassettes are placed in a cassette box. These cassette boxes are typically made of plastic, and may have latches to close the lid. The cassette boxes may also hold one or two cassettes.

A major problem in the manufacturing of integrated circuits or semiconductor wafers is the lack of knowledge concerning position of inventory in the manufacturing process. Typically, a piece of paper is taped to a cassette box with the identity and progress through the process indicated on the paper. However, the actual physical position of the cassette box is unknown. The box may be on a table, or in a rack, or stacked on the floor. If it is needed, a person is required to go and look for the box. It is possible that several hundred boxes are in process at the same time, thus positive control and location identification are missing. The addition of a bar code to the boxes would greatly facilitate the positive identification of these boxes. Movement of the boxes, however, would tend to generate dust particles and would interfere with the manufacturing process.

Accordingly, there is a need for an optical bar code reader which can identify a stationary article such as a cassette box and provide an indication of its location without any relative movement between the box and the bar code reader.

SUMMARY OF THE INVENTION

The apparatus of the present invention provides a bar code reader for reading a static bar code having contrasting light and dark segments. The apparatus includes a stationary CCD array having light sensitive elements which are disposed in operative relationship to the static bar code. The light sensitive elements of the CCD array provide an electrical output representative of the contrasting light and dark segments. The image of the bar code may be enhanced by illuminating the bar code and focusing the image on the CCD array by using mirrors and a lens assembly. The electrical output of the CCD array is converted to a digital waveform and encoded using a biphase code or Manchester code. The biphase encoded waveform is presented to a suitably programmed microprocessor or other utilization device which makes use of the information included in the bar code.

DETAILED DESCRIPTION OF THE INVENTION

Figure 1:
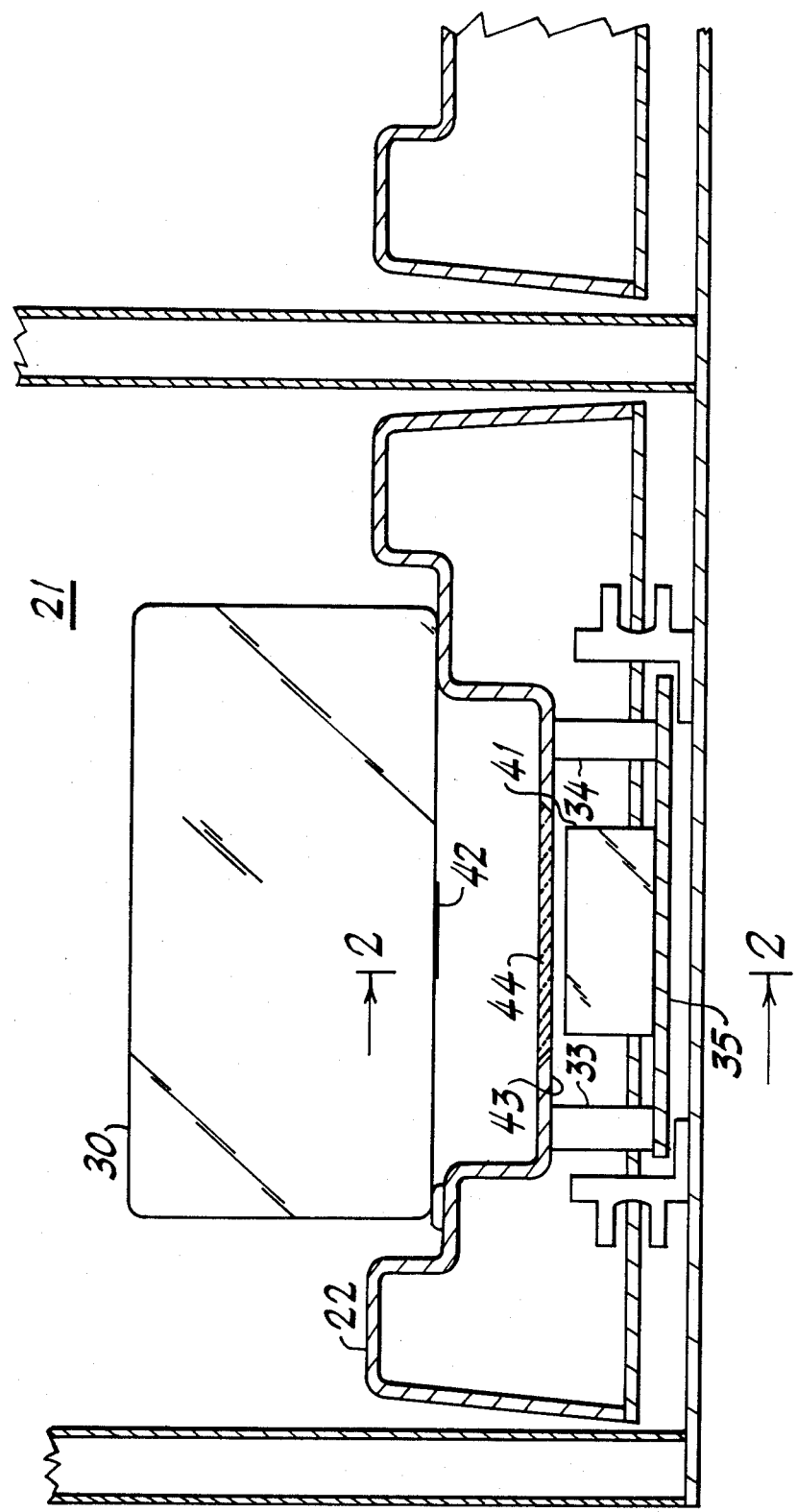
FIG. 1 is a partial cross sectional view of a bar code reader and a coded article.

Referring now to FIG. 1 there is an illustration in partial cross section of an article 30 disposed within a bin 21. The article 30 which may be a wafer cassette box is shown disposed upon a tray 22 which may be fabricated from sheet metal, plastic, or some other suitable material.

The tray 22 is preferably mounted on the mechanical structure of the bin 21 and may be removed from the bin 21. Brackets 33, 34 extend from the tray 22 and are connected to a printed circuit board 35. In addition to the electronics mounted on the printed circuit board 35, the optical code reader of the present invention is disposed in a housing 41. The optical code reader is capable of reading a bar code 42 disposed upon the bottom surface of the article 30. Illumination from the optical code reader passes through a transparent plate 44 disposed in the tray 22 above the optical code reader.

Figure 2:
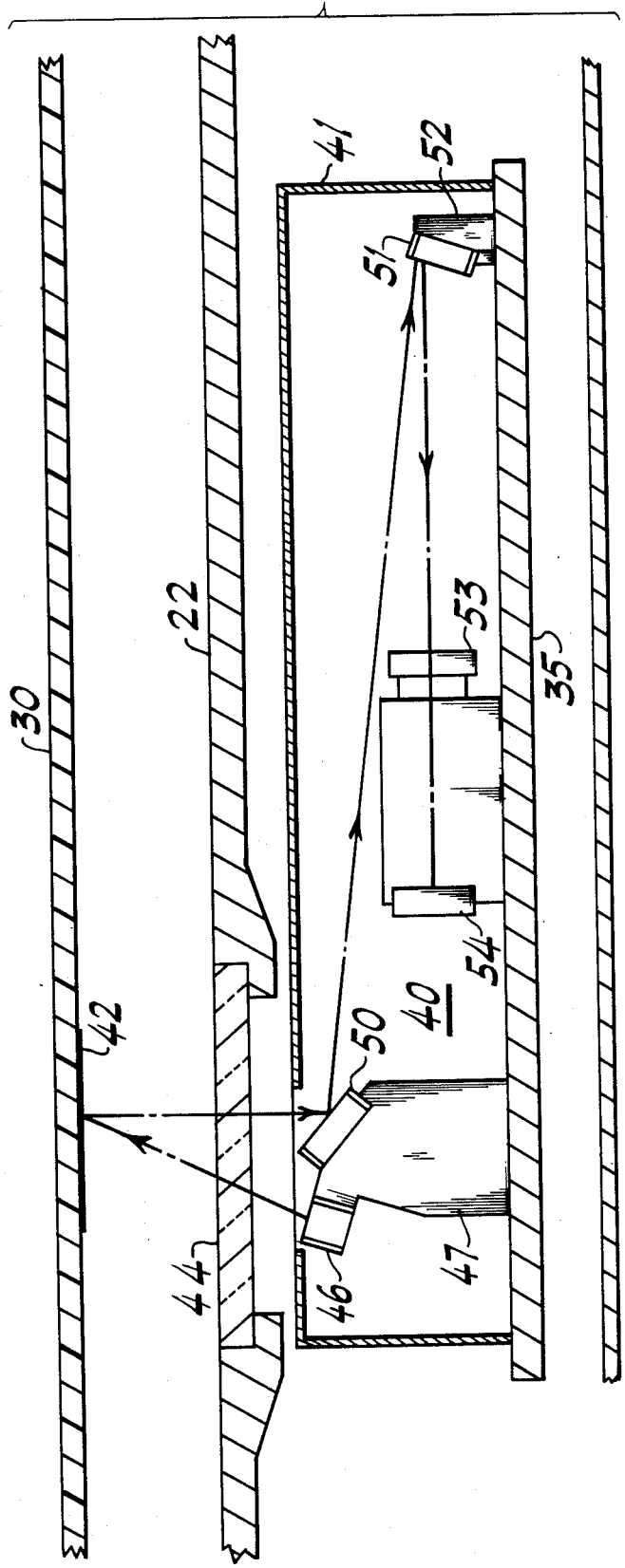
FIG. 2 is a cross sectional view taken along line 2—2 of FIG. 1, illustrating the mechanical details of the optical bar code reader.

Referring now to FIG. 2, a partial cross sectional view taken along line 2—2 of FIG. 1 is provided. FIG. 2 illustrates the mechanical details of the optical code reader 40. The optical code reader 40 includes a light source 46 which is preferably a plurality of LEDS and which is mounted on a base 47. Light from the light source 46 passes through the glass plate 44 disposed in the bottom of tray 22 and illuminates the bar code 42 on the bottom of article 30. A first mirror 50 which is also mounted on the base 47 reflects the image of the bar code 42 to a second mirror 51 which is mounted on a base 52. A lens assembly 53 focuses the image from mirror 51 on to a detector 54 which is preferably a CCD (charged coupled device) such as the commercially procurable CCD 112 sold by Fairchild Semiconductor Corp.

Figure 3A:
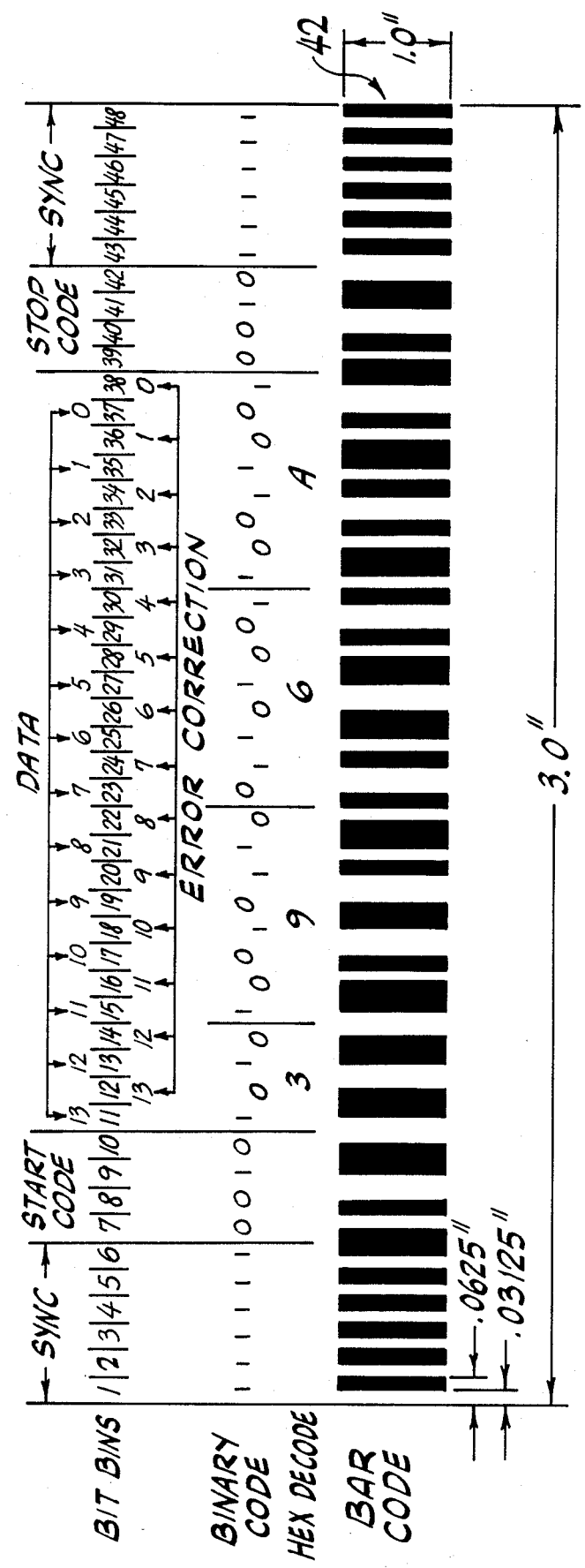
FIG. 3A is an illustration of a bar code adaptable for use with the present invention and FIG. 3B is an actual reproduction of the preferred bar code.

Referring now to FIG. 3A, an illustration of a bar code 42 which is adaptable for use with the present invention is provided. The contrast ratio between the bars and the background in the bar code area is at least 80%. This dictates the use of a pigment based ink to print the bar code because of the spectrum of the illumination which is preferably 850–950 nanometers. In the normal state, the illumination 46 of the bar reader 40 is disabled.

The bar code field is preferably 36 bits in length with an additional twelve synch bits (six on each end). The reader 40 has the capability to read the bar code 42 in either direction thereby allowing the article 30 to be inserted into the bin 21 without concern about the orientation. The 36 bit bar field consists of a four bit start code, a four bit stop code, 16 bits of data and sixteen bits for error checking/correction code. The bar code 42 is located on the article 30. The placement tolerance of the article 30 in the bin 21 is +/−0.1875 inch. The bar/space pair in the bar code 42 is 0.0625 inches. The bars on the bar code may be lengthened to increase the ability of the CCD array to read the bar code.

Figure 3B:
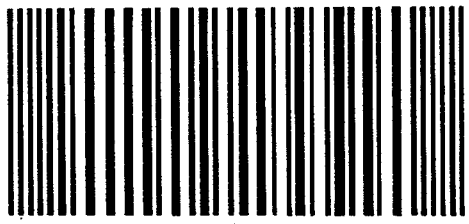

Referring now to FIG. 3B, an actual reproduction of the preferred bar code is provided. The bar code may be printed upon an adhesive decal that can be affixed to the cassette box or article 30.

Figure 4:
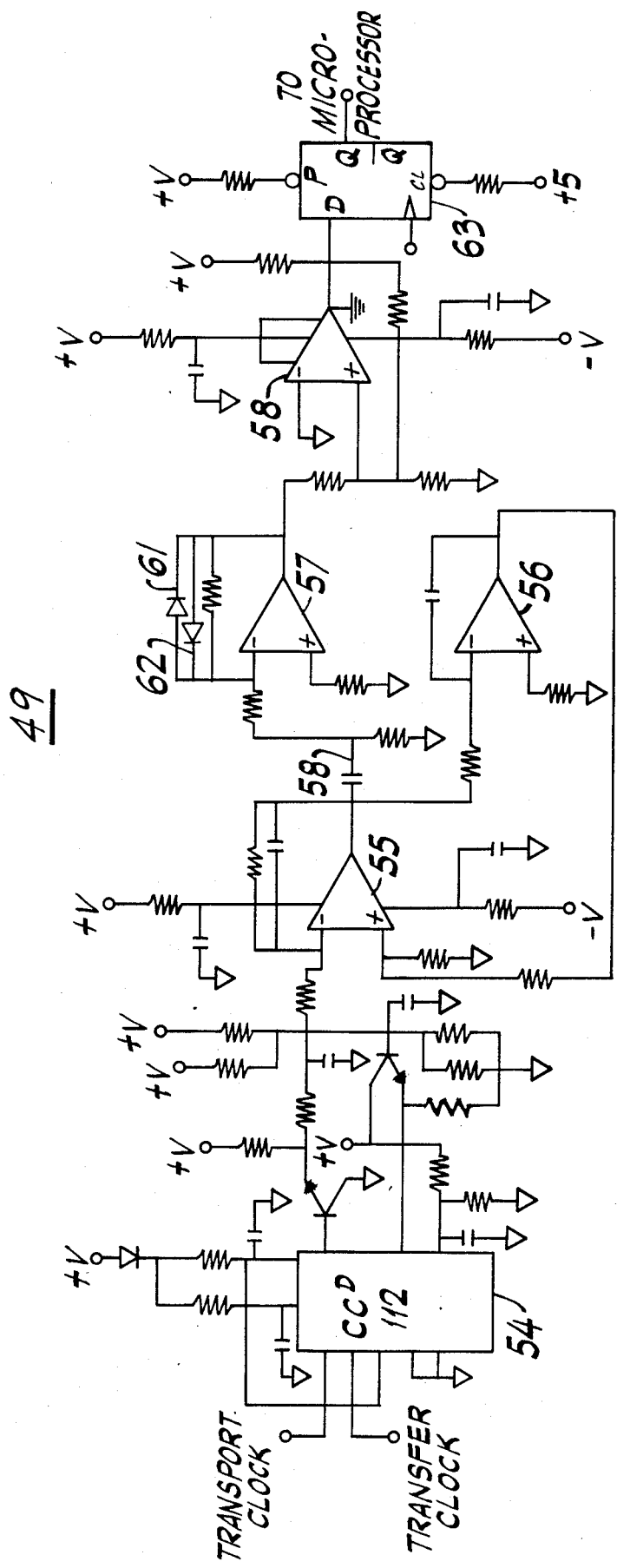
FIG. 4 is a schematic diagram of a charged coupled device and its associated electronics which form a part of the optical bar code reader.

Referring now to FIG. 4, a schematic block diagram of the electronic circuit 49 employing the CCD array 54 is provided. The inputs to the CCD array 54 include two clocks, a transport clock signal and a transfer clock signal which are specified by the manufacturer. There are numerous ways to generate these two clock signals, but preferably they are generated by a counter which addresses a prom that has a logic one at every other address location. If the clock signal generator is physically located more than a foot from the bar code reader, it is preferable to encode the transfer and transport clock signals using a biphase code such as the Manchester code. The Manchester code limits the bandwidth requirement. The encoded transfer and transport clocks are then decoded before application to the CCD array 54.

The photosites of CCD array 54 are responsive to the light from the image of the bar code 42 and convert this light to a plurality of charges. The charges are dumped to analog shift registers which shift the charges to an output stage that converts the charges to a voltage. The shift registers and output stage are integral parts of the CCD array 54. The transport clock signal controls the analog shift registers of the CCD array 54 and the transfer clock signal controls the transfer of information from the photosites to the analog shift registers. For one scan of the CCD array 54 it requires one transfer clock signal to transfer the information from the photosites to the analog shift registers, and it requires more than 256 transport clocks for a 256 bit array to dump the analog shift registers.

The output voltages of the CCD array 54 are applied to a video amplifier which includes the operational amplifier 55. The output signals of the CCD array 54, however, have a fairly high impedance and require buffering to transform them to a low impedance prior to application to the video amplifier. The operational amplifier 55 may be separated from the CCD array 54 due to physical constraints. The buffer at the CCD array 54 is provided because of transmission problems with high impedance sources. The buffering of the output of the CCD array 54 avoids noise problems. The output of the operational amplifier 55 is applied to a type one servo-system which includes the operational amplifier 56. The operational amplifier 56 acts as an integrator and removes the offset from the output of the operational amplifier 55 and prevents it from saturating.

The amplified output of the operational amplifier 55 is ac-coupled to the operational amplifier 57 by the capacitor 58. The operational amplifier 57 and diodes 61, 62 act as a limiter. The output of the operational amplifier 57 is fed into the operational amplifier 58 which performs a level detecting function and acts as a comparator to transform the analog voltage to a digital voltage. The digital voltage is then applied to a D-type flip flop 63 which synchronously detects the bar in the bar code. The output of the D-type flip flop 63 is then applied to a suitably programmed microprocessor for further processing to recover the desired data of the bar code. If the microprocessor is more than approximately a foot from the D-type flip flop 63, the output should be preferably Manchester encoded for transmission to the microprocessor.

Figure 5:
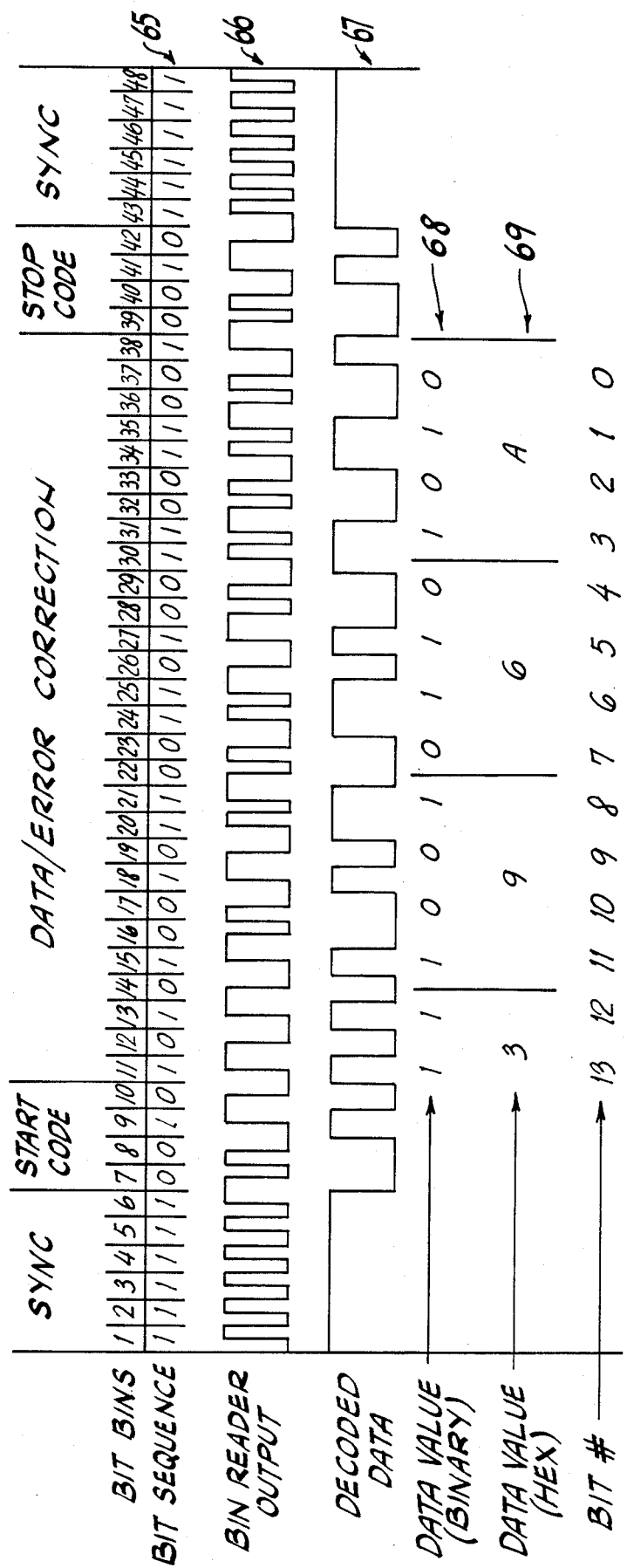
FIG. 5 is a waveform diagram of various signals associated with the optical bar code reader.

Referring now to FIG. 5, a plurality of waveforms associated with the optical bar code reader 40 are provided. As mentioned above the bar code 42 is preferably 36 bits in length with additional twelve synch bits (six on each end). The thirty-six bits include a start code, data, error correction and a stop code. The binary numbers 65 provide a representative example of the forty-eight bits on a typical bar code. The waveform 66 represents the biphase or Manchester encoded output of the CCD electronics 49 which is transmitted to a microprocessor when the microprocessor is more than a foot away. The waveform 67 represents the decoded data in a NRZ format which has been processed by the microprocessor. The data can then be expressed in either a binary format 68 or a hexadecimal format 69.

Figure 6:
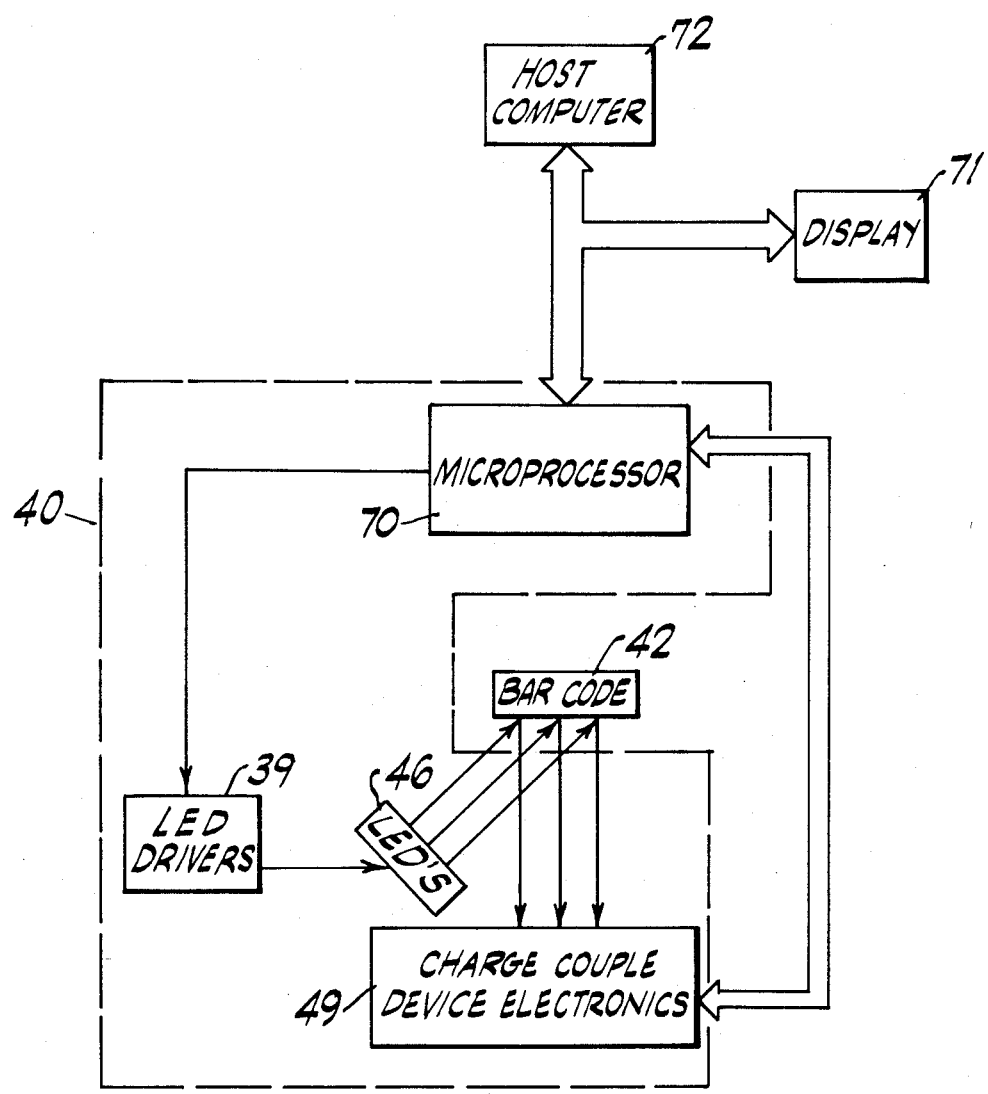
FIG. 6 is a schematic block diagram of the optical bar code reader coupled to a host computer.

Referring now to FIG. 6, a block diagram of the optical code reader 40 coupled to a host computer 72 is provided. The optical code reader 40 is comprised of the charge coupled device electronics 49, the LED's 46 having drivers 39, and the microprocessor 70. Preferably, the microprocessor 70 is an Intel 8086 microprocessor. The microprocessor 70 is capable of controlling the LED's 46, reading the output of the charge coupled device electronic 49, and processing that output to insure that bar code 42 has been correctly interpreted. The microprocessor 70 is also capable of providing a display 71 with an indication that the bar code has been correctly interpreted and the display can if desired display an alpha-numeric representation of the bar code 42. The display 71 can be a CRT, LED's, or some other suitable display device. If the bar code 42 has not been correctly interpreted the display 71 can preferably provide an error indication to alert a human operator.

Figure 7:
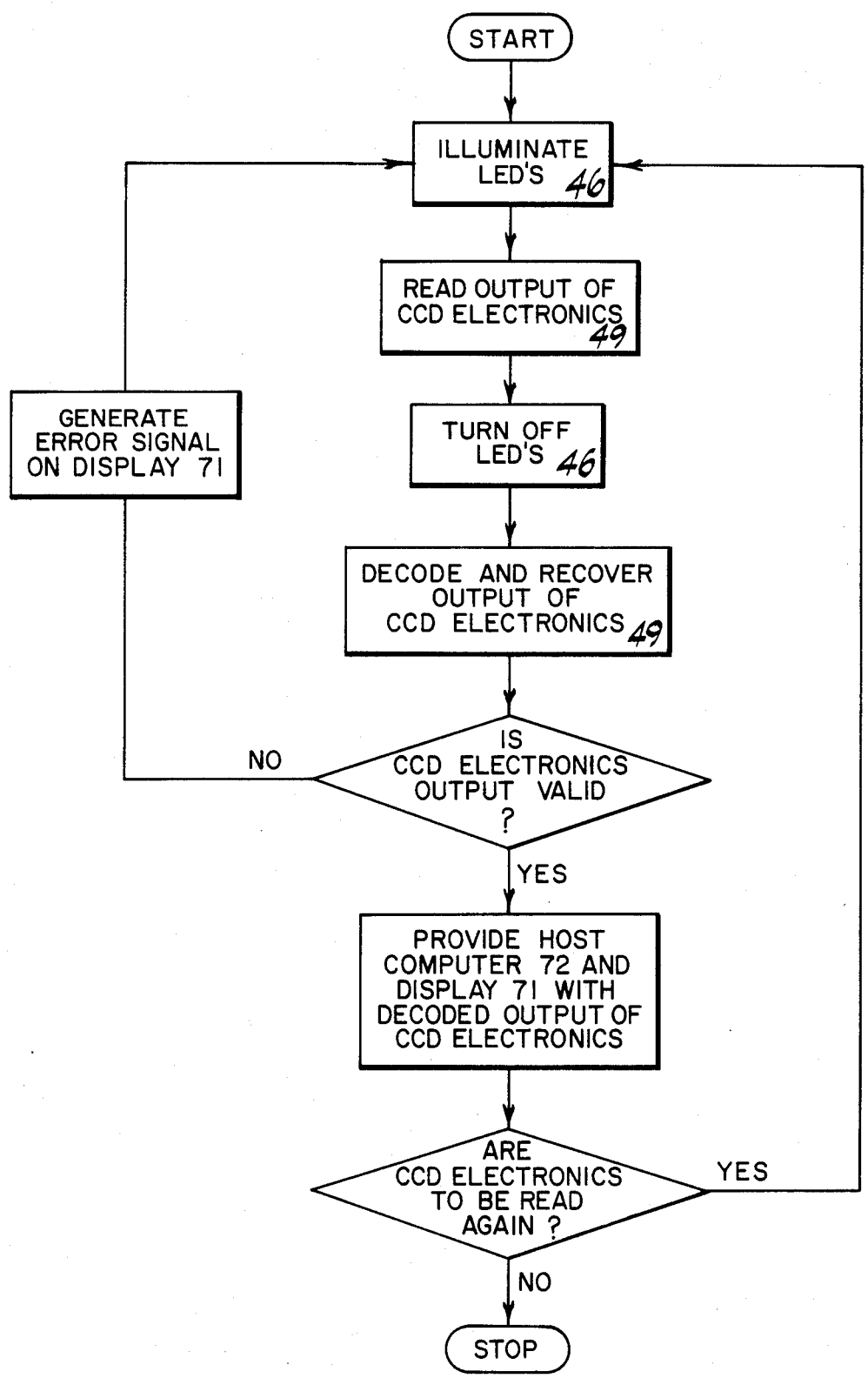
FIG. 7 is a flow diagram of the computer software associated with a microprocessor.

Referring now to FIG. 7, a flow diagram illustrates the software control that the microprocessor 70 exercises over the optical code reader 40 of the present invention. The bar code reader 40 is normally in a quiescent state in which the illumination 46 is not activated. When a request to read a particular bar code 42 is received from software, the first operation that is performed is to activate the illumination or LED's 46. After a time delay, the software sends a request to read and the image of the bar code 42 is captured by the CCD electronics 49. The LED's 46 are then turned off.

The bar code reader 40 is designed to read the bar code image on the article 30 after it comes to rest in the bin 21. The image is sensed in the 256 element CCD array 54. The CCD array 54 is continously monitoring light patterns returning from the read area and is operated at a fixed integration time. Thus the CCD array 54 is continously accumulating the light energy returning from the active reader area and transferring this information to the buffer amplifiers and signal conditioning circuits associated with the CCD array 54. When the software requests a read operation, the CCD output is then made available to the microprocessor 70.

The output of the CCD electronics 49 needs to be processed to decode and to recover the information of the bar code 42. If the output of the CCD electronics 49 has been biphase or Manchester encoded for transmission to the microprocessor the CCD electronics 49 must be decoded to the NRZ format. Prior to being decoded to the NRZ format, however, it is sometimes necessary to recover a valid signal from the CCD electronics 49, since the photosites are not necessarily aligned with the bars of the bar code 42. Due to the size at the bars which are illustrated and specified in FIG. 3 and the particular geometry of the Fairchild Semiconductor Corporation CCD array 54, the biphase or Manchester encoded output signals of the CCD electronics 49 will have pulses of a predetermined pulse width length. In other words, each short and long pulse in the waveform 66 of FIG. 5 must conform to a predetermined pulse width size. A short pulse must be either two or three pulse widths and a long pulse must be either five or six pulse widths. If a pulse happens to be four pulse widths, it indicates that a bar of bar code 42 was equally disposed between two photosites of the CCD array 54 and is of a questionable length. The existence of a pulse of four pulse widths causes the microprocessor 70 to manipulate the data representative of the pulse widths of the remaining pulses in the waveform 66 until the data represents a waveform 66 having the correct long and short pulse widths. The correct long and short pulse widths are determined by the microprocessor repetitiously examining permissible combinations of long and short pulse widths and then selecting the combination that coincides with the predetermined stop, start and synch codes. The preferred algorithm for decoding the output of the CCD electronics 49 is provided in the computer program of Appendix A. The program is written in the computer language C and can be used by a computer programmer of ordinary skill in the art to decode the output of the CCD array electronics 49.

Once the output of the CCD electronics 49 has been properly decoded and recovered the host computer 72, the display 71 or utilization device can be provided with the information of the bar code 42. If the microprocessor 70 can not validate the bar code information an error indication is provided on the display 71. A human operator can then inspect the article 30 to insure that it was properly disposed in front of the optical bar code reader 40 or can inspect the bar code 42 for physical defects. Once the human operator clears the fault, the normal procedure for reading a bar code 42 can resume. After the bar code 42 has been properly read and the article has been removed from the bar code reader 40 a new article 30 and bar code 42 can be disposed in front of the bar code reader 40 for reading.

While the invention has been described in its preferred embodiments it is to be understood that the words which have been used are words of description, rather than limitation, and that changes may be made within the purview of the appended claims without departing from the true scope and spirit of the invention in its broader aspects.

What is claimed:

1. A static bar code reader for reading a stationary bar code affixed to a container used in an inventory system, comprising:
   a light sensitive charge coupled device which is affixed to a bin for receiving said container, said charge coupled device being stationarily disposed relative to the stationary bar code;
   means for imaging the contrasting segments of the stationary bar code on to the light sensitive elements of said charge coupled device;
   means for illuminating said stationary bar code; and
   circuit means for converting the output of said light sensitive elements to an electrical signal that is representative of the information included in the stationary bar code.

2. A static bar code reader according to claim 1 wherein said imaging means includes means for holding said container stationary relative to said charge coupled device.

3. A static bar code reader according to claim 2 wherein said imaging means includes a plurality of reflecting surfaces and a lens assembly for imaging the bar code on to the charge coupled device.

4. A static bar code reader according claim 3 wherein said imaging means includes a transparent surface disposed between said illuminating means and the bar code.

5. A static bar code reader according to claim 4 wherein said illuminating means includes a plurality of LED's.

6. A static bar code reader according to claim 1 which further includes display means responsive to said circuit means for providing an indication of the information contained in the bar code.

7. A static bar code reader according to claim 1 wherein said circuit means includes means for converting the output of said charged coupled device into a digital format.

8. A static bar code reader according to claim 7 wherein said circuit means further includes microprocessor means for processing the digital output into a signal useful for application to utilization means.

9. A static bar code reader according to claim 8 wherein said utilization means includes display means.

10. A static bar code reader according to claim 8 wherein said utilization means includes a host computer.

11. A static bar code reader according to claim 8 wherein said mean for converting the output of the charge coupled device into a digital format includes means for amplifying the output of the charge coupled device, integrating means responsive to said amplifying means for removing an offset bias from the amplified output, means responsive to said amplifying means for limiting the amplified output, and comparing means responsive to said limiting means for providing the output having a digital format.

12. A static bar code reader according to claim 11 wherein the output of said comparing means is applied to a D type flip flop.

13. A static bar code reader for reading a stationary bar code affixed to a cassette box used in the manufacture of semiconductor devices, comprising:
   a light sensitive charge coupled device affixed to a bin for receiving said cassette box, said charge coupled device being stationarily disposed relative to said stationary bar code;

means for imaging the contrasting segments of said stationary bar code on said charge coupled device;

means for illuminating said stationary bar code; and circuit means coupled to said charge coupled device for generating an output signal representative of the information included in said stationary bar code.

14. The device of claim 13; and further comprising microprocessor means for actuating said means for illuminating, for reading said output signal from said circuit means, and for processing said output signal to verify that said stationary bar code has been correctly interpreted.

15. The device of claim 14; and further comprising display means coupled to said microprocessor means for providing an indication of the information contained in said bar code.

16. The device of claim 15; wherein said imaging means includes optical means for focusing the light from said bar code onto said charge coupled device.

17. The device of claim 16; wherein said optical means includes mirror means for reflecting said light from said bar code; and lens means for focusing said light onto said charge coupled device.

18. The device of claim 17; wherein said imaging means further includes mounting means for mounting said mirror means so that said mirror means reflects said light from said bar code substantially transverse to the axis of said light.

19. The device of claim 18; wherein said means for illuminating includes a plurality of light emitting diodes, and means for positioning said light emitting diodes to illuminate said bar code.

20. The device of claim 13; and further comprising housing means for containing said charge coupled device, said means for illuminating, and said circuit means, said housing means being compactly dimensioned to be disposed between said cassette box and said bin.

* * * * *